US012525793B2

(12) United States Patent
Ye et al.

(10) Patent No.: US 12,525,793 B2
(45) Date of Patent: Jan. 13, 2026

(54) SURGE PROTECTION DEVICE (SPD) WITH DOUBLE-TRIP MECHANISM

(71) Applicant: XIAMEN SET ELECTRONICS CO., LTD., Xiamen (CN)

(72) Inventors: Jian Ye, Xiamen (CN); Xianggui Zhang, Xiamen (CN)

(73) Assignee: XIAMEN SET ELECTRONICS CO., LTD., Xiamen (CN)

( * ) Notice: Subject to any disclaimer, the term of this patent is extended or adjusted under 35 U.S.C. 154(b) by 339 days.

(21) Appl. No.: 18/286,227

(22) PCT Filed: Mar. 9, 2022

(86) PCT No.: PCT/CN2022/079979
§ 371 (c)(1),
(2) Date: Oct. 10, 2023

(87) PCT Pub. No.: WO2022/218066
PCT Pub. Date: Oct. 20, 2022

(65) Prior Publication Data

US 2024/0204511 A1 Jun. 20, 2024

(30) Foreign Application Priority Data

Apr. 16, 2021 (CN) ......................... 202120789280.4

(51) Int. Cl.
*H02H 9/04* (2006.01)

(52) U.S. Cl.
CPC .................................... *H02H 9/04* (2013.01)

(58) Field of Classification Search
CPC .......... H02H 9/04; H01H 37/76; H01H 85/00; H01H 71/24; H01H 71/2445
(Continued)

(56) References Cited

U.S. PATENT DOCUMENTS 4,532,486 A * 7/1985 Terrier .................. H01H 89/08 335/22
5,192,934 A * 3/1993 Milianowicz .......... H01H 71/32 335/172

(Continued)

FOREIGN PATENT DOCUMENTS

CN 204857626 U 12/2015
CN 105448611 A 3/2016

(Continued)

*Primary Examiner* — Dharti H Patel
(74) *Attorney, Agent, or Firm* — Bayramoglu Law Offices LLC

(57) ABSTRACT

A surge protection device (SPD) with a double-trip mechanism includes two trip structures on a frame, where the two trip structures are respectively a first trip structure and a second trip structure; the first trip structure includes a slider and a first tension spring; the first tension spring includes one end connected to the frame, and the other end connected to the slider; the second trip structure includes a second tension spring; the second tension spring includes one end connected to the frame, and the other end connected to the reed; and when the SPD is triggered, the first tension spring drives the slider to move to the electrode and be located between the electrode and the reed, and the second tension spring drives the reed to move toward a direction away from the electrode.

8 Claims, 4 Drawing Sheets

(58) Field of Classification Search
USPC .......................................................... 361/118
See application file for complete search history.

(56) References Cited

U.S. PATENT DOCUMENTS

| | | | | |
|---|---|---|---|---|
| 10,062,530 | B2 * | 8/2018 | Yang | H01C 7/12 |
| 2004/0149555 | A1 * | 8/2004 | Jordan | H01H 71/1009 200/400 |
| 2008/0043395 | A1 * | 2/2008 | Donati | H01C 7/126 361/118 |
| 2011/0170217 | A1 * | 7/2011 | Mao | H01H 37/761 361/2 |
| 2011/0222199 | A1 * | 9/2011 | Ludewig | H01C 7/126 361/91.1 |
| 2014/0327990 | A1 | 11/2014 | Juricev | |
| 2016/0111871 | A1 | 4/2016 | Ruess | |
| 2016/0379789 | A1 * | 12/2016 | Fasano | H01H 71/1009 335/18 |
| 2023/0085845 | A1 * | 3/2023 | Min | H01C 7/126 338/21 |

FOREIGN PATENT DOCUMENTS

| | | | | |
|---|---|---|---|---|
| CN | 106026067 | B * | 5/2018 | H01H 85/0241 |
| CN | 213937431 | U | 8/2021 | |
| CN | 214588697 | U | 11/2021 | |
| DE | 102015000329 | B3 | 5/2016 | |

* cited by examiner

SURGE PROTECTION DEVICE (SPD) WITH DOUBLE-TRIP MECHANISM

CROSS REFERENCE TO THE RELATED APPLICATIONS

This application is the national phase entry of International Application No. PCT/CN2022/079979, filed on Mar. 9, 2022, which is based upon and claims priority to Chinese Patent Application No. 202120789280.4, filed on Apr. 16, 2021, the entire contents of which are incorporated herein by reference.

TECHNICAL FIELD

The present disclosure relates to the technical field of surge protection, and in particular to a surge protection device (SPD) with a double-trip mechanism.

BACKGROUND

As a common low-voltage protection device, an SPD is normally in a high impedance state. In the case of a surge on the circuit due to a lightning strike or other reason, the SPD is connected in a very short time to lead a lightning current or an overvoltage to the ground via a grounding wire, thereby protecting an electrical appliance on the circuit. If the SPD becomes deteriorated for various reasons, heat is dramatically produced in the SPD in the event of a surge. Without the protection action of the SPD, the circuit accident will be aggravated. Due to the single mechanical trip mechanism, existing SPDs have a relatively low trip reliability, and a poor arc extinguishing effect in a high-voltage direct current (DC).

SUMMARY

In view of defects of the prior art, a technical problem to be solved by the present disclosure is to provide an SPD with a double-trip mechanism.

To solve the above technical problems, the present disclosure provides the following technical solutions: An SPD with a double-trip mechanism includes a frame, an electrode, and a reed, where the electrode is fixedly provided on the frame; the reed corresponds to the electrode and is welded with the electrode through a low-temperature alloy; the SPD further includes two trip structures on the frame; and the two trip structures are respectively a first trip structure and a second trip structure;

- the first trip structure includes a slider and a first tension spring; and the first tension spring includes one end connected to the frame, and the other end connected to the slider;
- the second trip structure includes a second tension spring; and the second tension spring includes one end connected to the frame, and the other end connected to the reed; and
- when the SPD is triggered, the first tension spring drives the slider to move to the electrode and be located between the electrode and the reed, and the second tension spring drives the reed to move toward a direction away from the electrode.

Further, a trip direction of the first tension spring is opposite to a trip direction of the second tension spring.

Further, the first trip structure further includes a first support, a second support, and a rotary post; the rotary post and the second support are arranged on the frame; the rotary post is connected to one end of the first support; the other end of the first support is connected to one end of the slider; the other end of the slider is connected to one end of the first tension spring; and the other end of the first tension spring is connected to the second support.

Further, the first tension spring is extended in response to a normal state of the SPD.

Further, the second tension spring is extended in response to a normal state of the SPD.

Further, a side of the reed toward the second tension spring is provided with a guiding portion, and an end of the slider toward a movement direction of the first tension spring is provided with a guiding surface matching with the guiding portion.

Further, the guiding portion is formed by inclining and extending the side of the reed toward the second tension spring toward the direction away from the electrode.

Further, a groove is formed in a side of the slider toward the reed, and a detecting line for absorbing an arc is provided in the groove.

The present disclosure has the following beneficial effects:

According to the SPD with a double-trip mechanism, the two trip mechanisms are independent of each other. In response to a failure of the first trip mechanism, the second trip mechanism can still work normally. Likewise, in response to a failure of the second trip mechanism, the first trip mechanism can still work normally. This makes the SPD trip normally, and reduces an abnormal tripping probability.

The above description is merely a summary of the technical solutions of the present disclosure. In order to make the technical means of the present disclosure understood more clearly and implemented in accordance with the content of the specification, and in order to make the above and other objectives, features and advantages of the present disclosure more obvious and comprehensible, specific implementations of the present disclosure are described below.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description merely show some embodiments of the present disclosure, and those of ordinary skill in the art may still derive other drawings from these drawings without creative efforts.

REFERENCE NUMERALS

Figure 1:
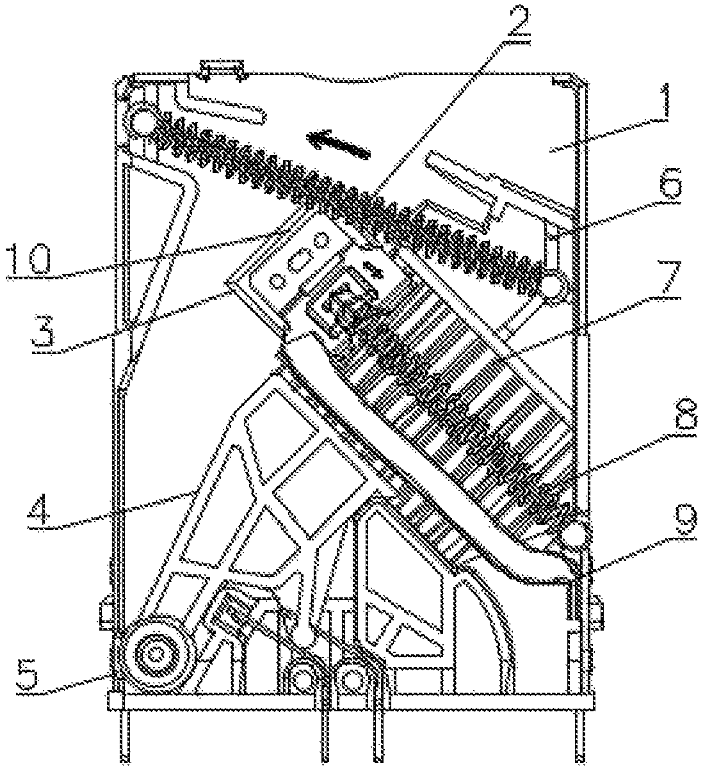
FIG. 1 is a schematic structural view of an SPD with a double-trip mechanism before a trip (a rotary double-trip mechanism)

1—frame, 2—first tension spring, 3—reed, 4—first support, 5—rotary post, 6—second support, 7—slider, 8—second tension spring, 9—detecting line, 10—electrode, 11—varistor, 12—third tension spring, 13—fourth tension spring, and 14—third support.

DETAILED DESCRIPTION OF THE EMBODIMENTS

For detailed description on the technical contents, objectives and effects in the present disclosure, the present disclosure is described below with reference to implementations and accompanying drawings.

Referring to FIG. 1 to FIG. 4, the present disclosure provides an SPD with a double-trip mechanism, including a frame, an electrode, and a reed. The electrode is fixedly provided on the frame. The reed corresponds to the electrode and is welded with the electrode through a low-temperature alloy. The SPD further includes two trip structures on the frame. The two trip structures are respectively a first trip structure and a second trip structure.

The first trip structure includes a slider and a first tension spring. The first tension spring includes one end connected to the frame, and the other end connected to the slider.

The second trip structure includes a second tension spring. The second tension spring includes one end connected to the frame, and the other end connected to the reed.

When the SPD is triggered, the first tension spring drives the slider to move to the electrode and be located between the electrode and the reed, and the second tension spring drives the reed to move toward a direction away from the electrode.

As can be seen from the above description, the present disclosure has the following beneficial effects:

According to the SPD with a double-trip mechanism provided by the present disclosure, the two trip mechanisms are independent of each other. In response to a failure of the first trip mechanism, the second trip mechanism can still work normally. Likewise, in response to a failure of the second trip mechanism, the first trip mechanism can still work normally. This makes the SPD trip normally, and reduces an abnormal tripping probability.

Further, a trip direction of the first tension spring is opposite to a trip direction of the second tension spring.

As can be seen from the above description, the trip direction of the first tension spring is opposite to the trip direction of the second tension spring, which ensures that the two trip structures do not affect to each other, and the electrode and the reed are kept as far away as possible.

Further, the first trip structure further includes a first support, a second support, and a rotary post. The rotary post and the second support are arranged on the frame. The rotary post is connected to one end of the first support. The other end of the first support is connected to one end of the slider. The other end of the slider is connected to one end of the first tension spring. The other end of the first tension spring is connected to the second support.

As can be seen from the above description, since the first support is connected to the rotary post, when the SPD is abnormal, the support is stressed under the tension spring, thereby driving the slider to rotate along the rotary post, and realizing a trip.

Further, the first tension spring is extended in response to a normal state of the SPD.

As can be seen from the above description, when the PSD is triggered, the extended first tension spring is retracted to realize a trip.

Further, the second tension spring is extended in response to a normal state of the SPD.

As can be seen from the above description, when the PSD is triggered, the extended second tension spring is retracted to realize a trip.

Further, a side of the reed toward the second tension spring is provided with a guiding portion. An end of the slider toward a movement direction of the first tension spring is provided with a guiding surface matching with the guiding portion.

As can be seen from the above description, with cooperation between the guiding portion and the guiding surface, the slider enters a space between the electrode and the reed more smoothly to prevent an abnormal trip.

Further, the guiding portion is formed by inclining and extending the side of the reed toward the second tension spring toward the direction away from the electrode.

Further, a groove is formed in a side of the slider toward the reed, and a detecting line for absorbing an arc is provided in the groove.

As can be seen from the above description, the detecting line for absorbing the arc is provided in the groove of the reed, such that the arc is reduced.

In the embodiment, the electrode is usually an electrode of a voltage-limiting component. The voltage-limiting component includes, but is not limited to, a varistor, a discharge tube, etc.

Figure 2:
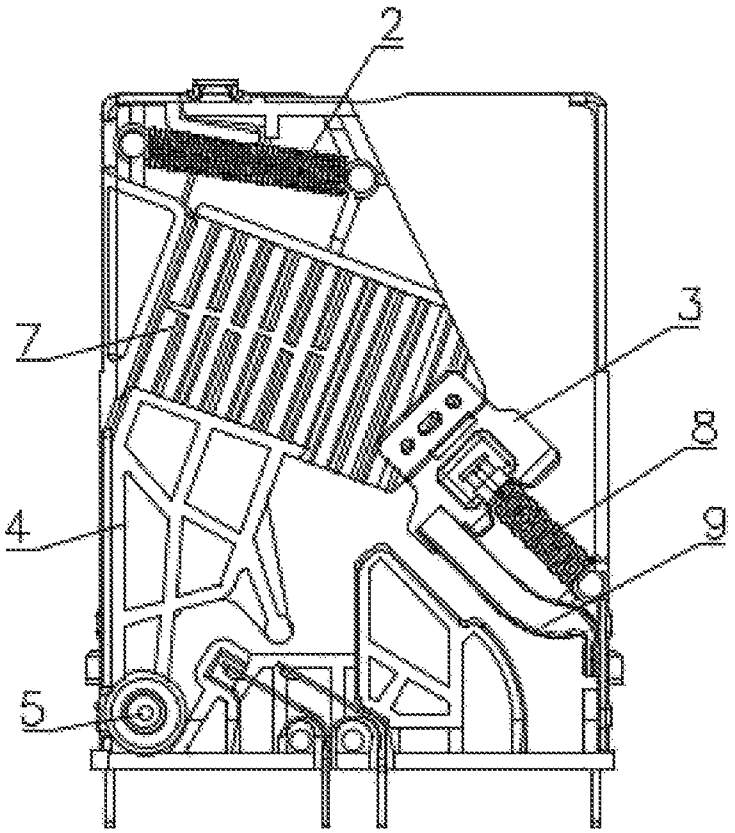
FIG. 2 is a schematic structural view of an SPD with a double-trip mechanism after a trip (a rotary double-trip mechanism)
Figure 3:
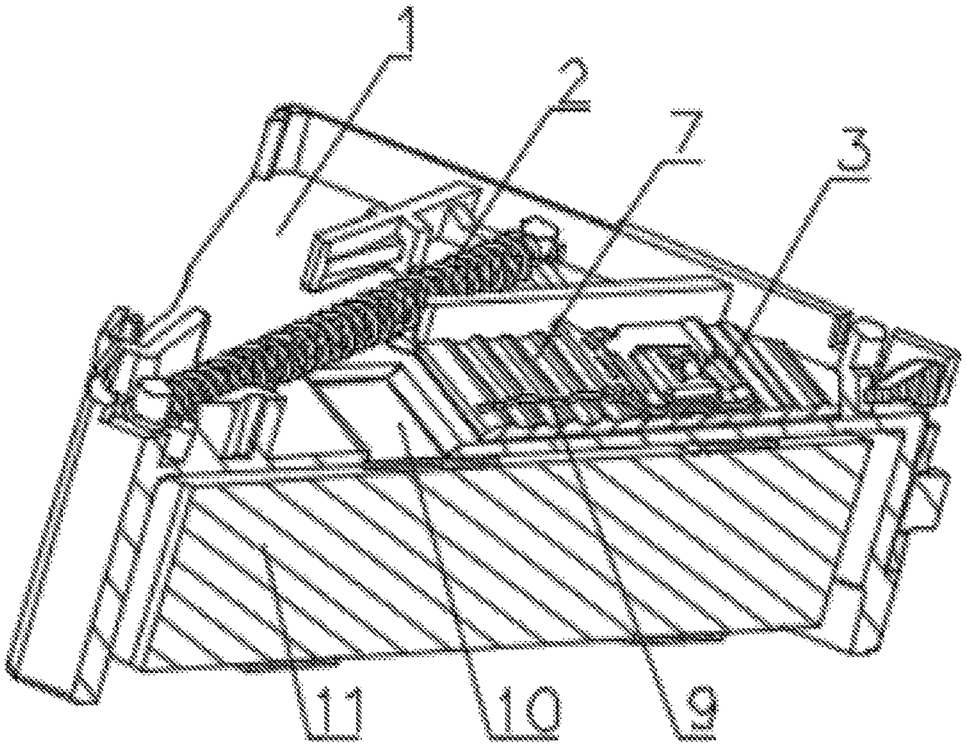
FIG. 3 is a schematic view illustrating a detecting line of a double-trip mechanism before a trip.

Referring to FIG. 1 to FIG. 3, the present disclosure provides a first embodiment:

FIG. 1 is a schematic structural view of an SPD with a rotary double-trip mechanism before a trip. FIG. 2 is a schematic structural view of an SPD with a rotary double-trip mechanism after a trip. FIG. 3 is a schematic view illustrating a detecting line of a double-trip mechanism before a trip. According to the SPD with a double-trip mechanism in the embodiment, two trip structures are provided on the frame. The two trip structures are respectively a first trip structure and a second trip structure. Specifically, the SPD specifically includes frame 1, first tension spring 2, reed 3, first support 4, rotary post 5, second support 6, slider 7, second tension spring 8, detecting line 9, electrode 10, and varistor 11. The electrode 10 is fixedly provided on the frame 1. The reed 3 corresponds to the electrode and is welded with the electrode 10 through a low-temperature alloy.

The first trip structure includes the slider 7, the first tension spring 2, the first support 4, the second support 6, and the rotary post 5. The rotary post 5 and the second support 6 are arranged on the frame 1. The rotary post 5 is connected to one end of the first support 4. The other end of the first support 4 is connected to one end of the slider 7. The other end of the slider 7 is connected to one end of the first tension spring 2. The other end of the first tension spring 2 is connected to the second support 6. The first tension spring 2 includes one end connected to the frame 1, and the other end connected to the slider 7.

The second trip structure includes the second tension spring 8. The second tension spring 8 includes one end connected to the frame 1, and the other end connected to the reed 3. A side of the reed 3 toward the second tension spring 8 is provided with a guiding portion. An end of the slider 7 toward a movement direction of the first tension spring 2 is provided with a guiding surface matching with the guiding portion. The guiding portion is formed by inclining and extending the side of the reed 3 toward the second tension spring 8 toward the direction away from the electrode. A groove is formed in a side of the slider 7 toward the reed 3. The detecting line 9 for absorbing an arc is provided in the groove.

In a normal state of the SPD, both the first tension spring 2 and the second tension spring 8 are extended. When the SPD is triggered, the first tension spring 2 drives the slider 7 to move to the electrode 10 and be located between the electrode 10 and the reed 3, and the second tension spring 8 drives the reed 3 to move toward a direction away from the electrode. A trip direction of the first tension spring 2 is opposite to a trip direction of the second tension spring 8, and thus trip processes of the two second tension springs do not affect to each other.

Figure 4:
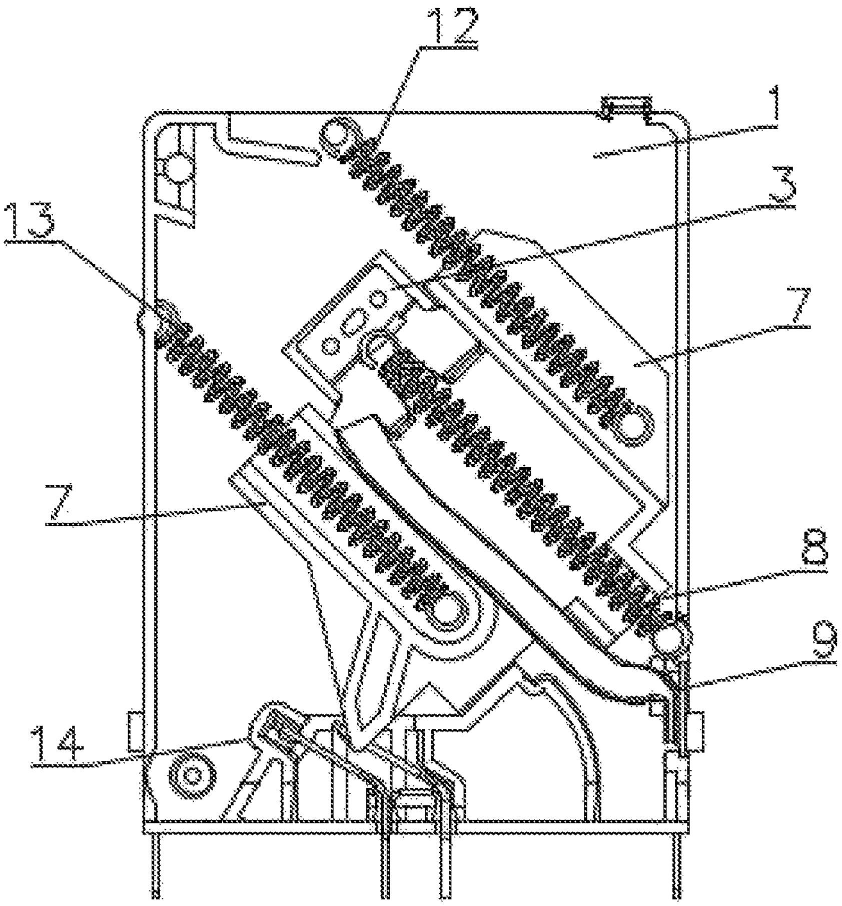
FIG. 4 is a schematic structural view of an SPD with a double-trip mechanism (a sliding double-trip mechanism).

Referring also to FIG. 4, the present disclosure provides a second embodiment:

FIG. 4 is a schematic structural view of an SPD with a sliding double-trip mechanism. According to the SPD with a double-trip mechanism in the embodiment, two trip structures are provided on the frame. The two trip structures are respectively a first trip structure and a second trip structure. Specifically, the SPD specifically includes frame 1, third tension spring 12, fourth tension spring 13, reed 3, third support 14, slider 7, detecting line 9, electrode 10, and varistor 11. The electrode 10 is fixedly provided on the frame 1. The reed 3 corresponds to the electrode and is welded with the electrode 10 through a low-temperature alloy.

The first trip structure includes the slider 7, the third tension spring 12, the fourth tension spring 13, and the third support 14. The third tension spring 12 and the fourth tension spring 13 each include one end provided on the frame, and the other end connected to one end of the slider 7. One end of the slider is connected to the third support 14.

The second trip structure includes the second tension spring 8. The second tension spring 8 includes one end connected to the frame 1, and the other end connected to the reed 3. A side of the reed 3 toward the second tension spring 8 is provided with a guiding portion. An end of the slider 7 toward a movement direction of the first tension spring 2 is provided with a guiding surface matching with the guiding portion. The guiding portion is formed by inclining and extending the side of the reed 3 toward the second tension spring 8 toward the direction away from the electrode. A groove is formed in a side of the slider 7 toward the reed 3. The detecting line 9 for absorbing an arc is provided in the groove.

In a normal state of the SPD, the third tension spring 12, the fourth tension spring 13 and the second tension spring 8 are extended. When the SPD is triggered, the first tension spring 12 and the fourth tension spring 13 drive the slider 7 to move to the electrode 10 and be located between the electrode 10 and the reed 3, and the second tension spring 8 drives the reed 3 to move toward a direction away from the electrode. A trip direction of each of the third tension spring 12 and the fourth tension spring 13 is opposite to a trip direction of the second tension spring 8, and thus trip processes of the two tension springs do not affect to each other.

In conclusion, according to the SPD with a double-trip mechanism provided by the present disclosure, the two trip mechanisms are independent of each other. In response to a failure of the first trip mechanism, the second trip mechanism can still work normally. Likewise, in response to a failure of the second trip mechanism, the first trip mechanism can still work normally. This makes the SPD trip normally, and reduces an abnormal tripping probability.

The foregoing are merely embodiments of the present disclosure and do not constitute a limitation on the scope of the present disclosure. Any equivalent change made by using the description and the accompanying drawings of the present disclosure, or direct or indirect application thereof in related technical fields, shall still fall in the protection scope of the patent of the present disclosure.

What is claimed is:

1. A surge protection device (SPD) with a double-trip mechanism, comprising a frame, an electrode, and a reed, wherein the electrode is provided on the frame; the reed corresponds to the electrode and is welded with the electrode through a low-temperature alloy; and the SPD further comprises a first trip structure and a second trip structure on the frame;

the first trip structure comprises a slider and a first tension spring; and the first tension spring comprises a first end connected to the frame, and a second end connected to the slider;

the second trip structure comprises a second tension spring; and the second tension spring comprises a first end connected to the frame, and a second end connected to the reed; and when the SPD is triggered, the first tension spring drives the slider to move to the electrode and be located between the electrode and the reed, and the second tension spring drives the reed to move toward a direction away from the electrode.

2. The SPD with the double-trip mechanism according to claim 1, wherein a trip direction of the first tension spring is opposite to a trip direction of the second tension spring.

3. The SPD with the double-trip mechanism according to claim 1, wherein the first trip structure further comprises a first support, a second support, and a rotary post; the rotary post and the second support are arranged on the frame; the rotary post is connected to a first end of the first support; a second end of the first support is connected to a first end of the slider; a second end of the slider is connected to the second end of the first tension spring; and the second end of the first tension spring is connected to the second support.

4. The SPD with the double-trip mechanism according to claim 3, wherein the first tension spring is extended in response to a normal state of the SPD.

5. The SPD with the double-trip mechanism according to claim 1, wherein the second tension spring is extended in response to a normal state of the SPD.

6. The SPD with the double-trip mechanism according to claim 1, wherein a side of the reed toward the second tension spring is provided with a guiding portion, and an end of the slider toward a movement direction of the first tension spring is provided with a guiding surface matching with the guiding portion.

7. The SPD with the double-trip mechanism according to claim 6, wherein the guiding portion is formed by inclining and extending the side of the reed toward the second tension spring toward the direction away from the electrode.

8. The SPD with the double-trip mechanism according to claim 1, wherein a groove is formed in a side of the slider toward the reed, and a detecting line for absorbing an arc is provided in the groove.

* * * * *